Nov. 13, 1934. J. D. OVERHOLT 1,980,631
CHICKEN BROODER HOUSE
Filed Sept. 21, 1932
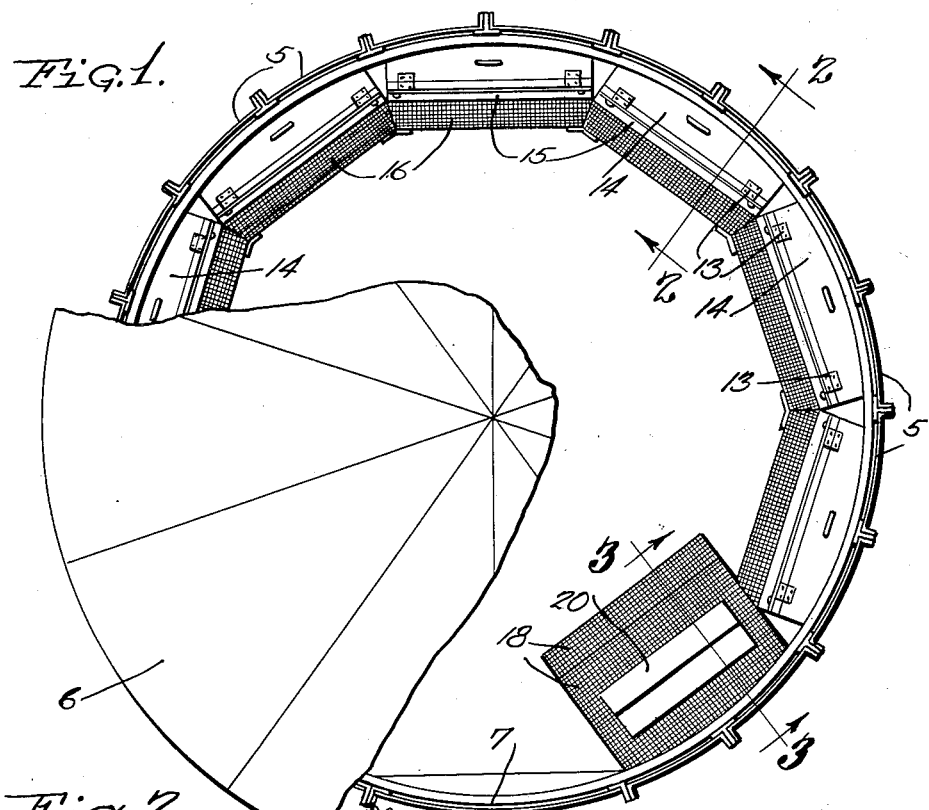
Inventor
J.D. Overholt.

Patented Nov. 13, 1934

1,980,631

UNITED STATES PATENT OFFICE

CHICKEN BROODER HOUSE 1,980,631

John D. Overholt, Wooster, Ohio

Application September 21, 1932, Serial No. 634,252

2 Claims. (Cl. 119—18)

This invention relates to certain new and useful improvements in a chicken brooder house.

The primary object of the invention is to provide an improved construction of chicken brooder house wherein contamination of feed and water is prevented while the chicks are also prevented from having access to feed or water splashed or spilled from the feed or water troughs and with the troughs so arranged as to provide a maximum of feeding space with the occupancy of the ground or floor area by the feeding and watering devices reduced to a minimum.

A further object of the invention is to provide a chicken brooder house of the type usually employing a centrally located heating medium for imparting warmth to the chickens, provision being made for increasing the floor or ground area of the house to eliminate overcrowding of the chickens and at the same time increase the feed bins and water fountains or troughs, all within the original area of a standard sized brooder house.

A further object of the invention is to provide a chicken brooder house wherein the feed bins and water troughs are approachable over screened platforms so that any feed dropping from the beaks of the chickens will fall through the screened platforms to be inaccessible to the chickens while water splashed from the fountains or troughs will fall within an area confined by a screened platform so that the ground or floor of the chicken house brooder will be entirely free of moisture or dampness as well as feed, thus eliminating the inauguration and spread of disease among the chickens by the absence of feed and water to be contaminated by droppings and preventing dirt or droppings entering feed or water troughs.

In the drawing:—

Figure 1 is a top plan view of a chicken brooder house constructed in accordance with the present invention, the cover wall being partly broken away to illustrate the arrangement of feed and water troughs at the side wall of the house;

Figure 2 is a cross-sectional view taken on line 2—2 of Figure 1, showing a feed box or hopper with the side wall of the housing constituting the back wall of the hopper and illustrating the raised screen tread forwardly of the hopper which sets on floor of house and is not attached to feeder; and Figure 3 is a cross-sectional view taken on line 3—3 of Figure 1, showing the elevated screen tread for the support of a water fountain or trough adjacent a side wall of the house.

The chicken brooder house disclosed herein is circular in top plan, it being understood however that the house may be of any shape desired and includes a perpendicular side wall 5 either set directly upon the ground or provided with a flooring and having a dome-shaped cover 6. Access to the house is obtained by means of the doorway 7 that is closed by the hinged door 8.

The basic idea of this invention is to arrange the feed and water trough within the house in a manner to provide a maximum of floor or ground area for the chickens and to so construct the feed and water trough that dirt or droppings are prevented from getting into the troughs and so that excess feed dropping from the beaks of the chickens and water splashed from the water trough fall within screened areas within the house to be inaccessible to the chickens and separated from droppings for the elimination of contamination and the spreading of disease, the particular arrangement of the feed troughs permitting increased feeding areas without unduly monopolizing increased floor or ground space within the house. The feed troughs are arranged in a circular series around the inner side of the wall 5 of the house at the ground or floor line in end contacting relation, each feed trough as illustrated in section in Figure 2 comprising a forwardly declined or flat bottom wall 9 having a depressed feed tray 10 at its lower forward edge, end walls 11, a forward wall 12 terminating at its lower end in upwardly spaced relation to the forward edge of the inclined bottom wall 9 and a top wall 13 including a hinged door 14. The wall 5 of the house constitutes the back wall of the feed trough. To provide a means of varying the opening into trough and to prevent dirt or droppings falling into trough from above, an adjustable gate or guard 15 is carried by the lower edge of the front wall 12 of the feed trough as illustrated. The feed tray 10 is elevated from the floor or ground line and is approachable by means of the elevated screen treads 16 and in the circular arrangement of the feed trough and screen tread, the latter abut at adjacent ends as illustrated in Figure 1 so that any feed accidentally or otherwise discharged from the feed tray 10 will fall through the screen treads 16 and be inaccessible to the chickens. The screen treads 16 extend outwardly into the housing a sufficient distance so that any feed accidentally discharged from the feed tray 10 will fall therethrough and be inaccessible to the chickens.

The water trough 17 as shown in detail in Figure 3 is mounted upon a screen tread 18 and carries upstanding posts 19 for the support of a hood 20 associated with the trough 17 in a manner whereby only the head or beak of the chicken is accessible to the water trough. Any water splashed from the trough 17 will fall upon the ground or floor within an area confined by the screen tread 18 so that the interior of the chicken brooder house accessible to the chickens is maintained in a dry and sanitary condition.

Disease among young chickens rapidly spreads by the mixing of feed with droppings resulting in contamination and the growth of germs is increased in the presence of water splashed from the water trough. With the present invention, all such difficulties are overcome and feed escaping from the feed tray 10 will fall through the screen tread 16 and be inaccessible to the chickens and any water splashed from the water trough 17 will fall through the screen tread 18 and be spaced from the run area within the house for the chickens. The arrangement of the feed troughs within the house provide maximum of run area for the chickens and by arranging the feed troughs in a circular series around the base of the perpendicular side wall 5, an abundance of feed is always present for the chickens. The feed and water troughs have adjustable openings therein permitting access to the trough contents and are regulable so that only the heads of the chicks may pass through the openings with the result that dirt or droppings are prevented from entering the troughs, thereby eliminating contamination of the feed and water.

I claim:—

1. In a chicken brooder house, a perpendicular wall, feed troughs arranged around the base of the wall and elevated screen treads for approach to the feed troughs, each feed trough having the wall of the brooder house form the back wall thereof, a depressed feed tray carried by the feed trough in a plane above the screen tread and an adjustable cover whereby the opening is varied to permit chicks to get heads only into feed tray.

2. In a chicken brooder house, a perpendicular wall, feed troughs arranged around the base of the wall and elevated screen treads for approach to the feed troughs, with the screen treads providing a continuously screened area forwardly of the feed troughs, each feed trough having the wall of the brooder house form the back wall thereof, a depressed feed tray carried by the feed trough in a plane above the screen tread and an adjustable cover carried by the trough and overlying the feed tray to vary the area of the opening from the trough to the tray whereby only the head of the chick may pass through the opening to obtain feed from the tray.

JOHN D. OVERHOLT.